United States Patent Office 3,475,518
Patented Oct. 28, 1969

3,475,518
SOLID POLYMONOOLEFIN COMPOSITIONS HAVING IMPROVED DYE RECEPTIVITY AND NEW BASIC NITROGEN POLYCONDENSATES EMPLOYED THEREIN
Giuseppe Cantatore, Terni, Italy, assignor to Montecatini Edison S.p.A., Milan, Italy, a corporation of Italy
No Drawing. Continuation-in-part of application Ser. No. 212,119, July 24, 1962. This application Mar. 31, 1967, Ser. No. 637,861
Claims priority, application Italy, July 27, 1961, 13,894/61
Int. Cl. C08f 29/10
U.S. Cl. 260—897                    10 Claims

ABSTRACT OF THE DISCLOSURE

Dye-receptive compositions, preferably in the form of textile fibers, comprising a mixture of (1) at least one solid polymonoolefin and (2) 1 to 25% by weight of a basic nitrogen polycondensate obtained by reacting (a) a member selected from the group consisting of disecondary diamines and polyamines containing at least two primary amino groups bound to tertiary carbon atoms and which behave as disecondary diamines due to steric hindrance, (b) epichlorohydrin and (c) a mono- or dihalide selected from the group consisting of monohalo and dihalo aliphatics containing from about 8 to 20 carbon atoms, monohalo and dihalo cycloaliphatics containing from about 8 to 20 carbon atoms, and mono and dihalo aromatics, in a molar ratio of 1 mol of the disecondary diamine or the polyamine either (i) with from about 0.85 to 0.95 mol of epichlorohydrin and from about 0.1 to 0.9 mol of monohalide or (ii) with from about 0.1 to 0.9 mol of epichlorohydrin and from about 0.9 to 0.1 mol of dihalide, the total of epichlorohydrin and dihalide being from about 0.85 to 1 mol per mol of the amine.

Process for preparing dye-receptive fibers comprising melting the above composition, extruding it and stretching the resulting fibers.

---

A basic nitrogen polycondensate obtained by reacting (a) a member selected from the group consisting of disecondary diamines and polyamines containing at least two primary amino groups bound to tertiary carbon atoms and which behave as disecondary diamines due to steric hindrance, (b) epichlorohydrin and (c) a mono- or dihalide selected from the group consisting of monohalo and dihalo aliphatics containing from about 8 to 20 carbon atoms, monohalo and dihalo cycloaliphatics containing from about 8 to 20 carbon atoms, and mono and dihalo aromatics in a molar ratio of 1 mol of the disecondary diamine or the polyamine either (i) with from about 0.85 to 0.95 mol of epichlorohydrin and from about 0.1 to 0.9 mol of monohalide or (ii) with from about 0.1 to 0.9 mol of epichlorohydrin and from about 0.9 to 0.1 mol of dihalide, the total of epichlorohydrin and dihalide being from about 0.85 to 1 mol per mol of the amine.

CROSS REFERENCE TO RELATED APPLICATIONS

This application is a continuation-in-part of copending application Ser. No. 212,119, filed July 24, 1962 now abandoned.

BACKGROUND OF THE INVENTION

Field of the invention

This invention relates to solid polymonoolefin compositions, preferably in the form of textile fibers, having improved dye-receptivity, and to new basic nitrogen polycondensate additives for improving the dye-receptivity of the polyolefins. More particularly, the present invention relates to certain improvements in the production of textile fibers containing polyolefins prepared with the aid of stereospecific catalysts, and to the preparation of the basic nitrogen polycondensates which are added to the polyolefin in order to render the fibers more receptive to dyes.

Description of the prior art

Previously, methods for preparing textile fibers having a considerable receptivity to dyes have been proposed. These methods comprise extruding mixes containing polyolefins and basic nitrogen compounds, which compounds are obtained by the condensation of epichlorohydrin with aliphatic amines or diamines or by the condensation of epichlorohydrin with a diamine, followed by alkylation with alkyl halides.

SUMMARY OF THE INVENTION

It has now surprisingly been found that dye-receptive compositions, preferably in the form of textile fibers, having a particular affinity for dyes are obtained by extruding mixes containing at least one polyolefin with 1 to 25% by weight, based on the weight of the mix, of nitrogen polycondensates possessing a basic character prepared by reacting one or more disecondary amines with epichlorohydrin and certain halogen derivatives.

Accordingly, the present invention provides dye-receptive polyolefin compositions, more particularly compositions wherein the polyolefin is polypropylene consisting essentially of isotactic macromolecules, said composition containing from about 1 to 25% by weight of a basic nitrogen polycondensate obtained by reacting (a) a member selected from the group consisting of disecondary diamines and polyamines containing at least two primary amino groups bound to tertiary carbon atoms and which behave as disecondary diamines due to steric hindrance, (b) epichlorohydrin and (c) a mono- or dihalide selected from the group consisting of monohalo and dihalo aliphatics containing from about 8 to 20 carbon atoms, monohalo and dihalo cycloaliphatics containing from about 8 to 20 carbon atoms, and mono and dihalo aromatics, in a molar ratio of 1 mol of the disecondary diamine or the polyamine either (i) with from about 0.85 to 0.95 mol of epichlorohydrin and from about 0.1 to 0.9 mol of monohalide or (ii) with from about 0.1 to 0.9 mol of epichlorohydrin and from about 0.9 to 0.1 mol of dihalide, the total of epichlorohydrin and dihalide being from about 0.85 to 1 mol per mol of the amine. The invention also provides a process for the production of these dye-receptive compositions in the form of textile fibers, as well as the basic nitrogen polycondensates which improve the dye receptivity of the fibers, these polycondensates being prepared by reacting (a) a member selected from the group consisting of disecondary diamines and polyamines containing at least two primary amino groups bound to tertiary carbon atoms and which behave as disecondary diamines due to steric hindrance, (b) epichlorohydrin and (c) a mono- or dihalide selected from the group consisting of monohalo and dihalo aliphatics containing from about 8 to 20 carbon atoms, monohalo and dihalo cycloaliphatics containing from about 8 to 20 carbon atoms, and mono and dihalo aromatics, in a molar ratio of 1 mol of the disecondary diamine or the polyamine either (i) with from about 0.85 to 0.95 mol of epichlorohydrin and from about 0.1 to 0.9 mol of monohalide or (ii) with from about 0.1 to 0.9 mol of epichlorohydrin and from about 0.9 to 0.1 mol of dihalide, the total of epichlorohydrin and dihalide being from about 0.85 to 1 mol per mol of the amine.

DESCRIPTION OF THE PREFERRED EMBODIMENTS

Disecondary amines such as aliphatic, aromatic, cycloaliphatic or heterocyclic disecondary amines containing 4 to 20 carbon atoms, such as piperazine, 2-methylpiperazine, 2,5-dimethylpiperazine, N-N'-dimethylhexamethylenediamine, N - N'-diisopropylhexamethylenediamine, N-N'-dimethylethylenediamine and N - N'-diisopropylethylenediamine, can be employed. In lieu of these disecondary diamines, polyamines containing two primary amino groups bound to tertiary carbon atoms (e.g., 1,8-paramethanediamine), which behave as disecondary amines due to steric hindrance, can also be employed in the present invention.

As the halogen-containing compounds, mono- or dihalides of aliphatic or cycloaliphatic compounds containing 8 to 20 carbon atoms or mono- or dihalides of aromatic compounds can be used, such as dodecenyl chloride, octadecyl chloride, dichloromethyl-m-xylene, p - xylylene dichloride and 1,10-dichlorodecane.

The preparation of the basic nitrogen polycondensate to be used in admixture with the polyolefin can be carried out, if desired, in the presence of suitable solvents such as methanol, ethanol, isopropanol, butyl alcohols, heptane and the like, and of condensing agents such as NaOH, KOH, sodium acetate and the like. The reaction is carried out at a temperature between room temperature and the reflux temperature, i.e., the boiling temperature of the solvent.

According to a particular feature of the present invention, the preparation of the basic nitrogen polycondensate is carried out by reacting 1 mol of the disecondary diamine or the polyamine either (i) with from about 0.85 to 0.95 mol of epichlorohydrin and from about 0.1 to 0.9 mol of monohalide or (ii) with from about 0.1 to 0.9 mol of epichlorohydrin and from about 0.9 to 0.1 mol of dihalide, the total of epichlorohydrin and dihalide being from about 0.85 to 1 mol per mol of the amine.

The mix containing the basic nitrogen polycondensate and the polyolefin or polyolefins may be obtained by agitating these products at room temperature in Henschel or Werner-type mixers or in ball mills or similar apparatus.

To obtain the dye-receptive fibers of the present invention, the mix is then granulated by melting in a screw device and is extruded in a melt-spinning device, preferably in absence of air and in the presence of an inert gas, at a temperature between about 180° C. and 320° C.

The spinning of the mixes can be carried out in the presence of a small amount of a solid dispersing agent which facilitates the homogeneous dispersion of the nitrogen product in the polymer mass and is preferably a compound such as cetyl and stearyl alcohol, stearic and terephthalic acid, benzoin, furoin, vinyl stearate, mono- di- and tri-stearic esters of glycerol, monoethanolamine stearate, stearic amide, N-diethanollauryl amide, $C_6$–$C_{30}$ aliphatic amines, condensation products of ethylene oxide with alcohols, amines and phenols, polystearamide, polyacrylic acid, polystyrene and styrene copolymers, terpene polymers, etc.

The filaments obtained by extrusion of the mixes of the present invention may be mono- or pluro-filaments and are used for preparing continuous fibers, staple fibers, bulk fibers or bulk staple fibers.

These mono- or pluro-filaments may be subjected to treatments for rendering the basic nitrogen compounds water-insoluble. Particularly suitable for this purpose are treatments with formaldehyde, diisocyanates, monomers which are capable of giving tridimensional structures such as divinylbenzene, vinylacetylene and the like, or with diepoxy compounds. These treatments may be carried out before or after stretching.

The stretching is effected using ratios between 1:2 and 1:10, at temperatures between 80° and 150° C., with suitable stretching devices heated with hot air, steam or a similar fluid or on a heated plate.

The spinning of the compositions of the present invention is preferably carried out by extrusion through spinnerets having holes with a length/diameter ratio higher than 1.

The fibers obtained in accordance with the present invention exhibit a remarkable receptivity to dyes such as acid dyes, metallized dyes and dispersed dyes. They have a good affinity also for the basic and vat dyes.

The fibers obtained by extrusion of the compositions of the present invention also show an increased stability, more particularly with respect to light.

The following examples are presented to illustrate the invention without limiting its scope.

In these examples, all parts and proportions are by weight unless otherwise indicated. In each case the intrinsic viscosity of the polypropylene was measured in tetrahydronaphthalene at 135° C. The residue after heptane extraction indicates the content of isotactic macromolecules in the polymer.

EXAMPLE 1

94.6 g. (1.1 mols) of anhydrous piperazine, 300 cc. of ethanol and 40.5 g. (0.2 mol) of dodecenyl chloride (1-chloro-5,5,7,7-tetramethyl-2-octene) were introduced into a 1-liter 3-necked flask provided with a mercury valve agitator, a thermometer and a reflux condenser. The mixture was refluxed for 12 hours. 8 g. of NaOH were then added, and, after 1 hour, 92.5 g. (1 mol) of epichlorohydrin were introduced.

The reaction mixture was kept at 30–40° C. for 1 hour and then refluxed for 10 hours while adding, during the last 5 hours of heating, 40 g. of NaOH in small portions. Sodium chloride was separated by warm filtration. The filtrate was poured into 1000 cc. of cold acetone while agitating. The powdery white precipitate thus obtained was separated by filtration and dried in an oven at 100° C. for 3 hours.

The product so obtained melted at 160–171° C. and had a nitrogen content of 16.52%.

A mix was prepared at room temperature in a Henschel-type mixer from 38.400 kg. of polypropylene and 1.600 kg. of the basic nitrogen polycondensate.

The polypropylene used had the following characteristics:

$[\eta]=1.32$;
ash content=0.025%;
residue after heptane extraction=95.6%.

The mix was granulated and then extruded in a melt spinning device under the following conditions:

Screw temperature=230° C.;
Spinning head temperature=220° C.;
Spinneret temperature=220° C.;
Spinneret type=60/0.8 x 16 mm.;
Maximum pressure=45 kg./cm.$^2$;
Winding speed=250 m./minute.

The fiber was stretched in a steam-heated device at a temperature of 130° C., with a stretching ratio of 1:5. It was then subjected to a dimensional stabilization, under condition of free shrinking, at 105° C. for 10 minutes.

The characteristics of the stretched and thermostabilized yarn were as follows:

Tenacity=5.1 g./den.;
Elongation=24%.

The fiber was then crimped and cut into a staple having a length of 6 cm. The staple thus obtained was dyed with the following dyes:

Alizarine yellow 2G (C.I. mordant yellow 1)—(acid dye)
Wool red B (C.I. acid red 115)—(acid dye)
Alizarine red S (C.I. mordant red 3)—(acid dye)
Alizarine blue SE (C.I. acid blue 43)—(acid dye)
Acid black JVS (C.I. acid black 1)—(acid dye)

Lanasyn yellow GLN (C.I. acid yellow 112)—(metallized dye)
Lanasyn red 2GL (C.I. acid red 216)—(metallized dye)
Lanasyn brown 3RL (C.I. acid brown 30)—(disperse dye)
Setacyl yellow 3G (C.I. disperse yellow 20)—disperse dye)
Cibacet scarlet BR (C.I. disperse red 18)—(disperse dye)
Setacyl brilliant blue BG (C.I. disperse blue 3)—metallized dye)

The dyeing was carried out at the boiling point of the baths for 1½ hours, in baths containing 2.5% of dye, calculated on the weight of the fiber, with a fiber/bath ratio of 1:40.

The dyeing with the acid and metallized dyes was carried out in the presence of 3% of ammonium acetate (by weight of the fiber) and 1% of a surface active agent consisting of the condensation product of ethylene oxide with octyl phenol.

30 minutes after boiling commenced, 2% (by weight of the fiber) of a 10% acid acetic solution was added in order to improve the rate of utilization of the baths.

The dyeing with disperse (plastosoluble) dyes was carried out in the presence of 2% of surface active agent (by weight of the fiber).

The fibers, after dyeing, were rinsed with running water. These fibers exhibited intense colors in all cases after the dyeings with acid, metallized and disperse dyes. The fastness of these colors to light, washing and rubbing was completely satisfactory.

A further improvement in the color fastness was obtained by subjecting the fibers, before dyeing, to a treatment with a 3% aqueous solution of ethylene glycol diglycidyl ether at 120° C. for 5 minutes.

EXAMPLE 2

94.6 g. (1.1 mol) of anhydrous piperazine, 200 cc. of isopropanol and 57.7 g. (0.2 mol) of n-octadecyl chloride were introduced into a 1-liter 3-necked flask provided with a mercury-valve agitator, a thermometer and a reflux condenser. The mix was refluxed for 36 hours. 8 g. of NaOH were then added and, after 1 hour, 92.5 g. (1 mol) of epichlorohydrin and 200 cc. of isopropanol were introduced.

The reaction mixture was then agitated at 30–40° C. for 1 hour and then refluxed for 10 hours while adding 40 g. of NaOH in small portions during the last 5 hours of heating. Sodium chloride was removed by warm filtration. The filtrate was evaporated by heating at 200° C. under vacuum.

A yellow resinous product melting at 182–196° C. and having a nitrogen content of 15.18%, was obtained.

A mix was prepared at room temperature in a Henschel-type mixer, from 43.200 kg. of polypropylene and 1.800 kg. of the basic nitrogen polycondensate.

The polypropylene used had the following characteristics:

$[\eta] = 1.32$;
Ash content=0.025%;
Residue after hepatane extraction=95.6%.

The mix was granulated and extruded under the following conditions:

Screw temperature=230° C.;
Spinning head temperature=220° C.;
Spinneret temperature=220° C.;
Spinneret type=60/0.8 x 16 mm.;
Maximum pressure=44 kg./cm.$^2$;
Winding speed=250 m./minute.

The fiber was stretched in a steam-heated device at a temperature of 130° C., with a stretching ratio of 1:5. It was then subjected to a dimensional stabilization treatment at 105° C. for 10 minutes under free shrinking conditions.

The characteristics of the stretched and thermostabilized yarn were as follows:

Tenacity=5.2 g./den.;
Elongation=25%.

The fiber was then crimped and cut into a staple having a length of 6 cm. Intense solid colors were obtained on this staple upon dyeing with the dyes used in Example 1.

EXAMPLE 3

430 g. (5 mols) of anhydrous piperazine and 304.5 g. (1.5 mols) of dichloromethyl-m-xylene (1,3 dimethyl-4,6 dichloromethylbenzene, $C_{10}H_{12}Cl_2$) suspended in 2,500 cc. of ethanol were introduced into a 6-liter 3-necked flask provided with a mercury-valve agitator, a thermometer and a reflux condenser. The mixture was agitated at 20–30° C. for 2 hours and then refluxed for 4 hours. During the last 2 hours of heating, 120 g. of NaOH were added in small portions.

The reaction mixture was then cooled to 20° C. and 324 g. (3.5 mols) of epichlorohydrin were added. After standing at 30–50° C. for 1 hour, the mixture was heated to 80° C. and this temperature maintained for 10 hours. During the last 5 hours, 140 g. of NaOH were added in small portions. Sodium chloride was separated by warm filtration and the solvent removed by heating under vacuum.

A white resinous product, melting at 63–71° C. and possessing a nitrogen content of 16.72%, was obtained.

A mix was prepared at room temperature in a Henschel-type mixer, from 9.6 kg. of polypropylene and 0.400 kg. of this basic nitrogen polycondensate.

The polypropylene used had the following characteristics:

$[\eta] = 1.42$;
ash content=0.031%;
residue after heptane extraction=96.7%.

The mixture was granulated and extruded under the following conditions:

screw temperature=230° C.;
spinning head temperature=220° C.;
spinneret temperature=220° C.;
spinneret type=60/0.8 x 16 mm.;
maximum pressure=47 kg./cm.$^2$;
winding speed=250 m./minute.

The fiber was stretched in a steam-heated device at a temperature of 130° C., with a stretching ratio of 1:5. It was then subjected to a dimensional stabilization treatment at 105° C. for 10 minutes under conditions of free shrinking.

The characteristics of the stretched and thermostabilized fiber were as follows:

tenacity=5.2 g./den.;
elongation=25%.

The fiber was then crimped and cut into a staple with a length of 6 cm. Intense solid colors were obtained on this staple upon dyeing with the dyes used in Example 1.

EXAMPLE 4

172 g. (2 mols) of anhydrous piperazine and 105 g. (0.6 mols) of p-xylylene dichloride (1,4 dichloromethylbenzene $C_8H_8Cl_2$) suspended in 800 cc. of ethanol were introduced into a 2-liter 3-necked flask provided with a mercury-valve agitator, a thermometer and a reflux condenser. The mixture was agitated for 2 hours at 20–30° C. and then refluxed for 4 hours. During the last two hours of heating, 48 g. of NaOH were added in small portions.

The reaction mixture was then cooled to 20° C. and 129.6 g. (1.4 mols) of epichlorohydrin were added. After agitation at 30–40° C. for 1 hour, the mixture was refluxed for 10 hours. During the last 5 hours of heating, 56 g. of NaOH were added in small portions. The solution was filtered and the solvent removed by heating under vacuum.

A white resinous product having a melting point of 106–114° C. and a nitrogen content of 17.74% was obtained.

A mix was prepared at room temperature in a Henschel-type mixer, from 5.760 kg. of polypropylene and 0.240 kg. of the basic nitrogen polycondensate.

The polypropylene used had the following characteristics:

$[\eta]=1.42$;
ash content=0.031%;
residue after heptane extraction=96.7%.

The mix was granulated and then extruded under the following condition:

screw temperature=230° C.;
spinning head temperature=220° C.;
spinneret type=60/0.8 x 16 mm.;
maximum pressure=41 kg./cm.$^2$;
winding speed=250 m./minute.

The fiber was stretched in a steam-heated device at a temperature of 130° C., with a stretching ratio of 1:5. It was then subjected to a dimensional stabilization treatment under conditions of free shrinking at 105° C. for 10 minutes.

The stretched and thermostabilized fiber had the following characteristics:

tenacity=5.5 g./den.;
elongation=22%.

The fiber was then crimped and cut into staple with a length of 6 cm. This staple gave intense solid colors upon dyeing with the dyes used in Example 1.

EXAMPLE 5

172 g. (2 mols) of anhydrous piperazine, 84.4 g. (0.4 mols) of 1,10-dichlorodecane and 400 cc. of isopropanol were introduced into a 2-liter 3-necked flask provided with a mercury-valve agitator, a thermometer and a reflux condenser. The mixture was refluxed for 24 hours. 32 g. of NaOH were added and, after 1 hour, 148 g. (1.6 mols) of epichlorohydrin and 400 cc. of isopropanol were added at 20° C. The mixture was kept at 30–45° C. for 1 hour and then refluxed for 10 hours, adding 64 g. of NaOH in small portions during the last 5 hours of heating.

Sodium chloride was separated by filtration and the solvent is removed by heating under vacuum.

A mix was prepared at room temperature in a Henschel-type mixer from 4.800 kg. of polypropylene and 0.200 kg. of this basic nitrogen polycondensate.

The polypropylene used had the following characteristics:

$[\eta]=1.42$;
ash content=0.031%;
residue after heptane extraction=96.7%.

The mix was granulated and then extruded under the following conditions:

screw temperature=230° C.;
spinning head temperature=220° C.;
spinneret temperature=220° C.;
spinneret type=60/0.8 x 16 mm.;
maximum pressure=40 kg./cm.$^2$;
winding speed=250 m./minute.

The fiber was stretched in a steam-heated device at 130° C., with a stretching ratio of 1:5. It was then subjected to a dimensional stabilization treatment under conditions of free shrinking at 105° C. for 10 minutes.

The stretched and thermostabilized fiber had the following characteristics:

tenacity=5.1 g./den.;
elongation=21%.

The fiber was then crimped and cut into a staple having a length of 6 cm. This staple exhibited intense solid colors upon dyeing with the dyes used in Example 1.

Variations and modifications can, of course, be made without departing from the spirit and scope of the present invention.

Having thus described the invention, what I desire to secure by Letters Patent and hereby claim is:

1. A dye-receptive composition which comprises (1) at least one solid polymonoolefin and (2) 1 to 25% by weight of a basic nitrogen polycondensate obtained by reacting (a) a member selected from the group consisting of disecondary diamines and polyamines containing at least two primary amino groups bound to tertiary carbon atoms and which behave as disecondary diamines due to steric hindrance, (b) epichlorohydrin and (c) a mono- or dihalide selected from the group consisting of monohalo and dihalo aliphatics containing from about 8 to 20 carbon atoms, monohalo and dihalo cycloaliphatics containing from about 8 to 20 carbon atoms, and mono and dihalo aromatics, in a molar ratio of 1 mol of the disecondary diamine or the polyamine either (i) with from about 0.85 to 0.95 mol of epichlorohydrin and from about 0.1 to 0.9 mol of monohalide or (ii) with from about 0.1 to 0.9 mol of epichlorohydrin and from about 0.9 to 0.1 mol of dihalide, the total of epichlorohydrin and dihalide being from about 0.85 to 1 mol per mol of the amine.

2. The composition of claim 1 wherein the solid polymonoolefin is polypropylene consisting essentially of isotactic macromolecules.

3. The composition of claim 1 wherein the basic nitrogen polycondensate is prepared by reacting piperazine, epichlorohydrin and dodencyl chloride.

4. The composition of claim 1 wherein the basic nitrogen polycondensate is prepared by reacting piperazine, epichlorohydrin and octadecyl chloride.

5. The composition of claim 1 wherein the basic nitrogen polycondensate is prepared by reacting piperazine, epichlorohydrin and dichloromethyl-m-xylene.

6. The composition of claim 1 wherein the basic nitrogen polycondensate is prepared by reacting piperazine, epichlorohydrin and p-xylylene dichloride.

7. The composition of claim 1 wherein the basic nitrogen polycondensate is prepared by reacting piperazine, epichlorohydrin and 1,10-dichlorodecane.

8. The composition of claim 1 wherein said mono- or dihalide is selected from the group consisting of dodecenyl chloride, octadecyl chloride, dichloromethyl-m-xylene, p-xylylene dichloride and 1,10-dichlorodecane.

9. A spinning mix comprising the composition of claim 1.

10. Textile fibers obtained from the composition of claim 1.

References Cited

UNITED STATES PATENTS 3,151,928  10/1964  Cappuccio et al. _____ 8—115.5

MURRAY TILLMAN, Primary Examiner

C. J. SECCURO, Assistant Examiner

U.S. Cl. X.R.

260—2, 78, 210, 211, 290, 342, 176

PO-1050
(5/69)

UNITED STATES PATENT OFFICE
CERTIFICATE OF CORRECTION

Patent No. 3,475,518      Dated October 28, 1969

Inventor(s) GIUSEPPE CANTATORE

It is certified that error appears in the above-identified patent and that said Letters Patent are hereby corrected as shown below:

Column 7, line 21, "condition." should read -- conditions. --.

Column 8, line 43, "dodencyl" should read -- dodecenyl -- .

SIGNED AND
SEALED
FEB 17 1970

(SEAL)
Attest:

Edward M. Fletcher, Jr.
Attesting Officer

WILLIAM E. SCHUYLER, JR.
Commissioner of Patents